United States Patent [19]

Ito et al.

[11] Patent Number: 4,492,478
[45] Date of Patent: Jan. 8, 1985

[54] METHOD AND APPARATUS FOR APPLYING MORTAR OR CONCRETE

[75] Inventors: Yasuro Ito, 38-16, Numabukuro 4-chome, Nakano-ku, Japan; Yoshiro Higuchi, Tokyo; Masanori Tsuji, Osaka; Yasuhiro Yamamoto, Kawasaki; Hiroshi Tada, Suita; Kenji Kuroha, Tokyo; Takashi Nakamura, Hasuda; Koichi Tomikawa, Yokohama, all of Japan

[73] Assignees: Yasuro Ito; Taisei Corporation, both of Tokyo, Japan

[21] Appl. No.: 372,950

[22] Filed: Apr. 29, 1982

[30] Foreign Application Priority Data

Sep. 18, 1981 [JP] Japan .................... 56-146065
Jan. 22, 1982 [JP] Japan .................... 57-6340[U]
Jan. 27, 1982 [JP] Japan .................... 57-10205
Jan. 27, 1982 [JP] Japan .................... 57-8682[U]
Jan. 27, 1982 [JP] Japan .................... 57-8683[U]

[51] Int. Cl.³ ............................................ B28C 5/38
[52] U.S. Cl. ........................................ 366/28; 366/34; 366/56; 366/64; 366/134; 366/135; 366/168; 366/178; 366/180; 366/195; 366/196; 366/227; 366/230

[58] Field of Search .................. 106/98; 118/306, 317, 118/DIG. 16; 366/2, 3, 5, 6, 10, 11, 12, 13, 20, 28, 30, 33, 34, 40, 53, 54, 57, 59, 156, 169, 170, 173, 187, 190, 196, 27, 37, 38, 56, 134, 135, 154, 168, 177, 178, 194, 195, 225, 227, 230

[56] References Cited

U.S. PATENT DOCUMENTS

| | | | |
|---|---|---|---|
| 1,531,594 | 3/1925 | Carozza | 366/6 |
| 2,199,093 | 4/1940 | Wolfenden | 118/DIG. 16 |
| 2,814,474 | 11/1957 | Erren | 366/59 |
| 2,895,449 | 7/1959 | Oldfield, Jr. | 118/306 |
| 3,134,579 | 5/1964 | Booth, Sr. | 366/20 X |
| 3,558,107 | 1/1974 | Williams | 366/6 |
| 3,810,441 | 5/1974 | Padgett | 118/306 X |
| 3,957,203 | 5/1976 | Bullard | 118/317 X |
| 4,039,169 | 8/1977 | Bartholomew | 366/28 |
| 4,299,633 | 11/1981 | Ito et al. | 106/98 X |

*Primary Examiner*—Robert W. Jenkins
*Assistant Examiner*—Arthur D. Dahlberg
*Attorney, Agent, or Firm*—Birch, Stewart, Kolasch & Birch

[57] ABSTRACT

One of ingredients of green concrete are supplied to a rotary disc through a central tube by a pump or low pressure air and the other ingredient is supplied to the rotary disc from a hopper by a screw conveyor. These ingredients are mixed together on a rotary disc and then projected by centrifugal force.

11 Claims, 18 Drawing Figures

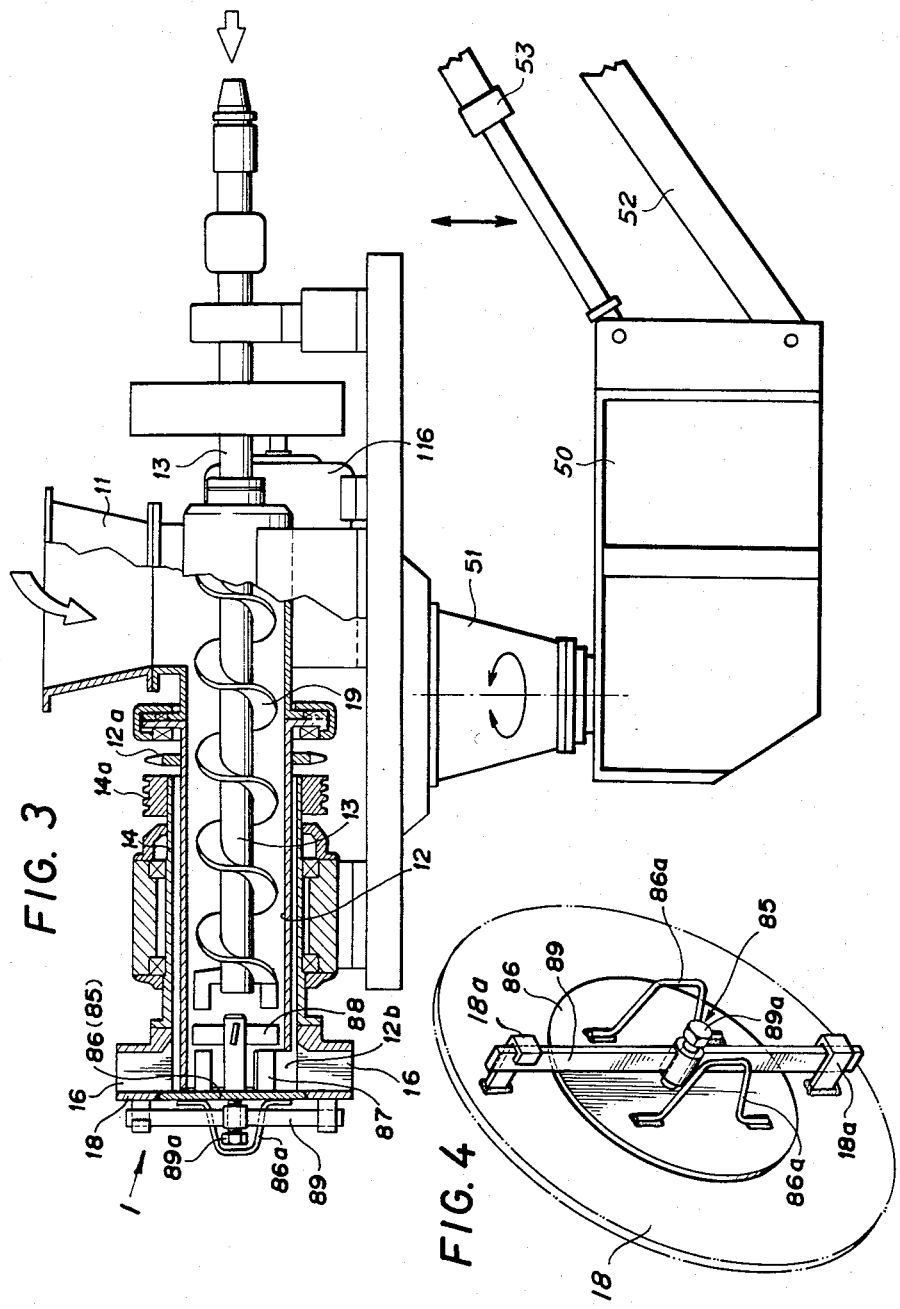

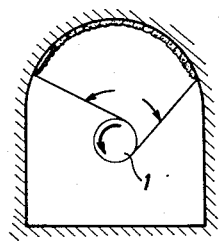 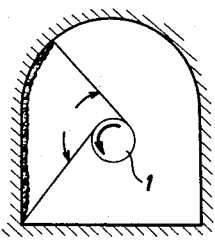 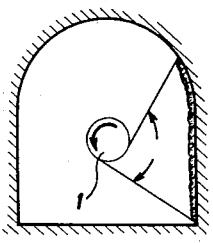
FIG.6A  FIG.6B  FIG.6C
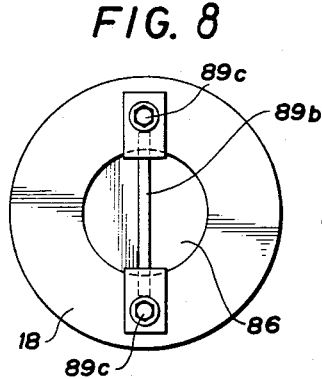 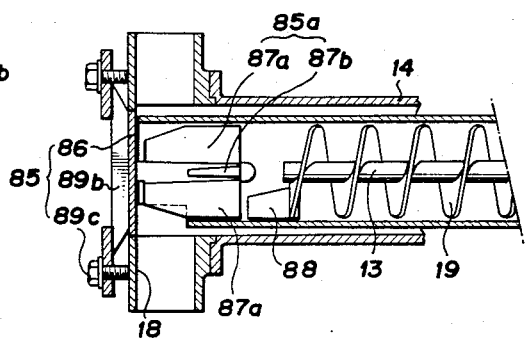
FIG. 8  FIG. 7
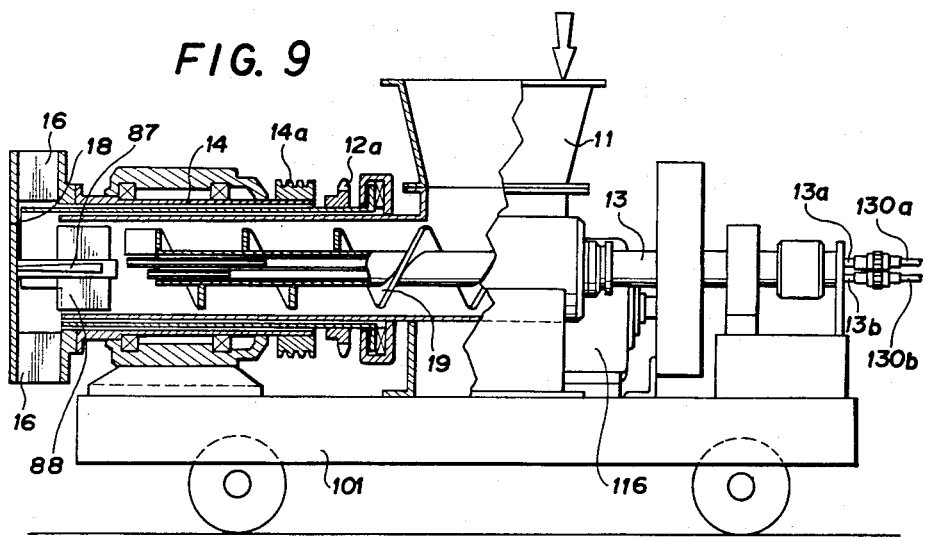
FIG. 9

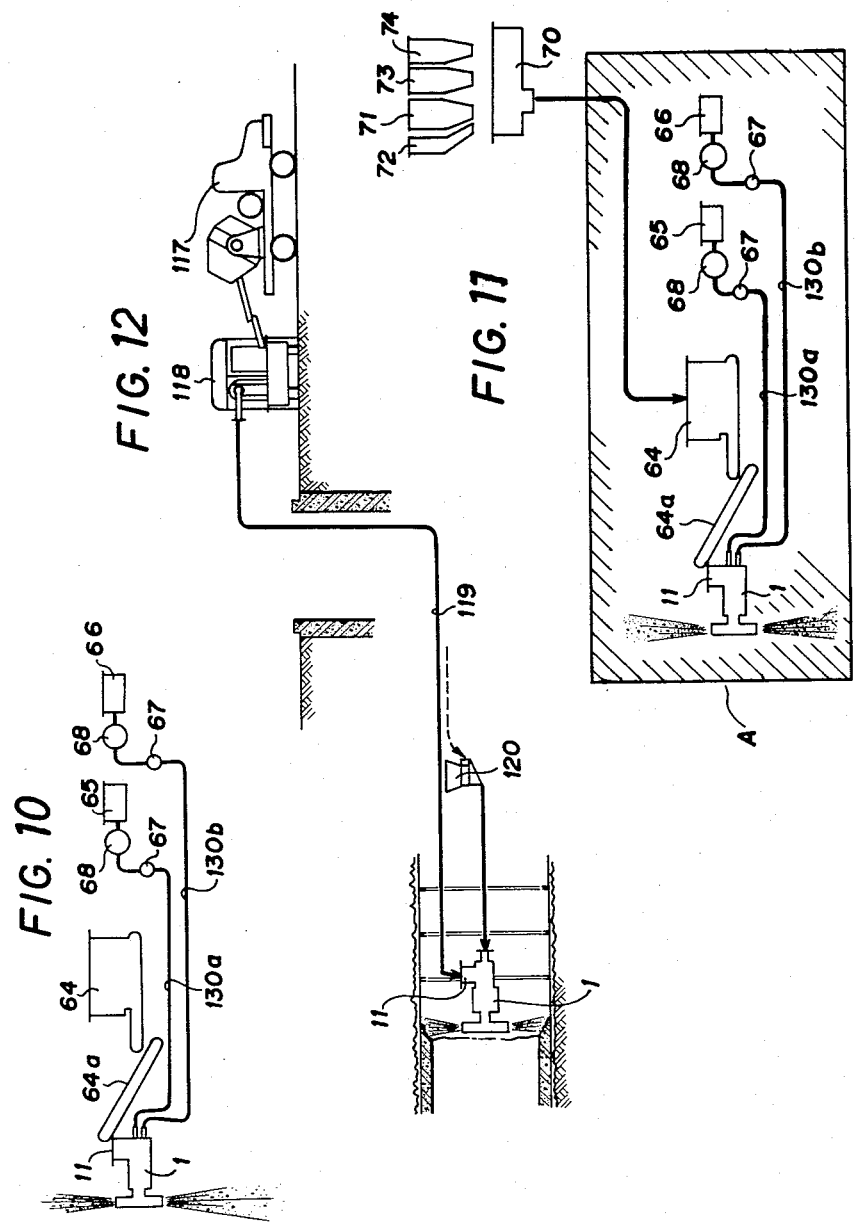

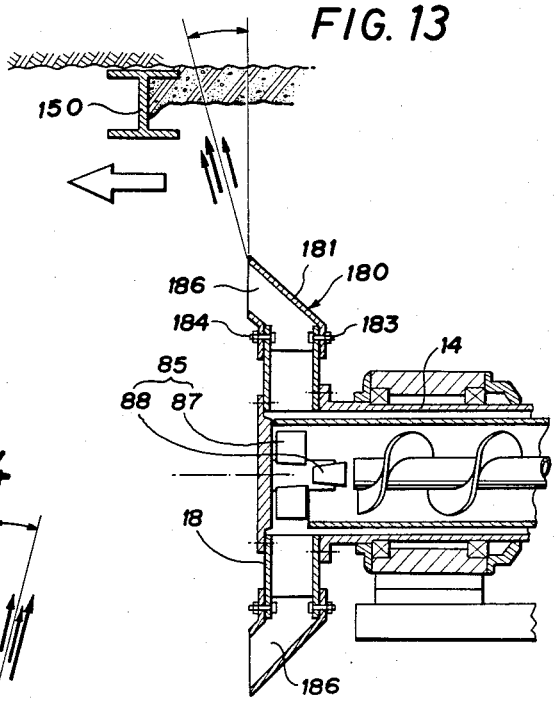
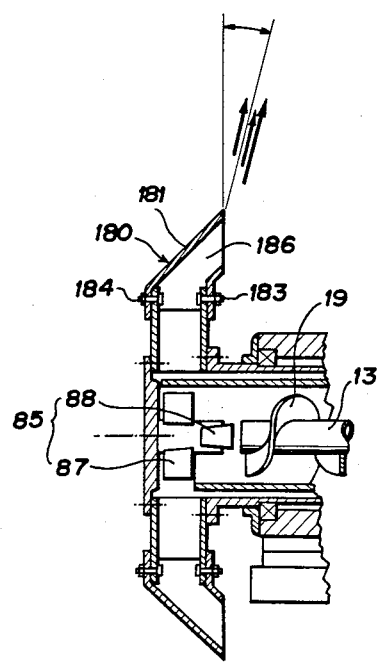

METHOD AND APPARATUS FOR APPLYING MORTAR OR CONCRETE

BACKGROUND OF THE INVENTION

This invention relates to a method and apparatus for applying a cement mortar or concrete by projection, and more particularly by centrifugal force.

Application of a cement mortar or concrete by blasting can be done without preassembling a frame or mould, and is not necessary to disassembly the mold after setting of the applied mortar or cement so that surface finishing can be immediately made. Thus, this method not only greatly simplified the work but also greatly shortens the working period. For this reason, in present days, the method of blasting is used in many cases.

Among the methods of blasting may be mentioned, the wet method, dry method and semiwet method. However, these prior art methods are advantageous in one case but disadvantageous in other cases. More particularly, according to the blasting method, such a hydraulic substance as cement, an aggregate, and water are kneaded to prepare a green concrete having a desired water to cement ratio (W/C), the green concrete is conveyed to the working field with a concrete pump, and then projected upon a wall surface through a nozzle. With this method, since cement is sufficiently wetted the concrete product has a high mechanical strength. However, where a green concrete of a W/C ratio manifesting the highest strength is prepared, such green concrete is difficult to convey through a conduit because of its high frictional resistance and high viscosity. Consequently, a pump pressure of the order of 50 $Kg/cm^2$ is necessary thus requiring a large driving power and strong conduit. Even with such expedience the maximum distance of conveyance is at most 50 to 60 m so that it is impossible to apply this method for constructing a long tunnel. Accordingly, in practice, the ratio W/C is increased more or less to improve fluidity of the green concrete, thus making it impossible to fully take advantage of the wet method. On the other hand, according to the dry method, concrete ingredients are conveyed to the field in a dry state by high pressure air, and the necessary quantity of water is added to the concrete ingredients in a blasting nozzle at the working field. The pressure of the air necessary to convey the concrete ingredients through a pipe may be about 5–6 $Kg/cm^2$ so that the dry method is advantageous to convey the concrete ingrediates over a long distance with a simple and inexpensive installation. However, kneading of the dry ingredients and water can not be performed efficiently and cement dust is generated in a great quantity so that it is impossible to apply kneaded concrete over a long time. Moreover, the mechanical strength of the blasted concrete is only one half of that of the concrete formed by the wet method, which is a fatal defect of the dry method. The semiwet method is an intermediate method in which water is incorporated at an intermediate point of the conveyance pipe instead of at the end thereof. Where water is added at a point 5 to 6 m ahead of the nozzle, the fluidity decreases greatly thus clogging the pipe, so that it is impossible to use a long pipe as in the dry method. Where water is added at a point close to the nozzle, it is difficult to sufficiently knead the concrete, this difficulty being similar to that encountered in the dry method. With any method, the resulting concrete is blasted to a surface by high pressure air so that concrete once applied onto the surface tends to be blown away by the blast. A quick setting agent normally used at the time of blasting is added at the nozzle, but it is difficult to uniformly admix the quick setting agent with the concrete whereby the applied concrete lacks uniformity. Also loss of the quick setting agent at the time of blasting is high and the lost agent forms a stimulative atmosphere which makes it difficult to work over a long time. Considering the shear strength of the blasted concrete layer, in both of the dry method and the wet method the shear strength is low because in the former air quantity in the blasted layer is large, while in the latter, the content of water is high.

SUMMARY OF THE INVENTION

Accordingly, it is an object of this invention to provide an improved method and apparatus for applying mortar or concrete without the accompanying various defects of the prior art methods described above.

Another object of this invention is to provide an improved method and apparatus capable of applying mortar or concrete without utilizing pressurized air thus decreasing the generation of dust and rebound at the working field.

Still another object of this invention is to provide a novel method and apparatus capable of uniformly incorporating a quick setting agent into green mortar or concrete and preventing splashing of the quick setting agent when the green mortar or concrete is applied.

A further object of this invention is to provide a method and apparatus for projecting green concrete capable of independently adjusting the speed of conveyance of the concrete ingredient and speed of projecting green concrete.

Still a further object of this invention is to provide apparatus for projecting green concrete in any desired direction.

Yet another object of this invention is to provide an apparatus capable of projecting green concrete and smoothing the surface of the applied concrete layer.

According to one aspect of this invention there is provided a method of applying mortar or concrete comprising the steps of preparing first and second materials necessary to prepare the mortar or concrete, conveying the first material to a working field with pressure means, conveying the second material to the working field with mechanical means, admixing the first and second materials at the working field and projecting the resulting mixture with a rotary energy.

According to another aspect of this invention there is provided apparatus for projecting mortar or concrete comprising a first material supply pipe for conveying under pressure the first material, one of the ingredients of the mortar or concrete, a hopper charged with the second material, the other of the ingredients of the mortar or concrete, a second material supply pipe connected to the hopper, a rotary screw disposed in the second material supply pipe for mechanically conveying the second material supplied from the hopper, a rotary disc for admixing the first and second materials conveyed through the first and second material supply pipes to project the resulting mixture, the first and second material supply pipes and the rotary disc being arranged coaxially and the first and second material supply pipes being arranged concentrically.

BRIEF DESCRIPTION OF THE DRAWINGS

In the accompanying drawings:

FIG. 3 is a side view, partly in longitudinal section, showing modified embodiment of the present invention;

FIG. 4 is a perspective view showing a base plate of an agitator utilized in the apparatus shown in FIG. 3;

FIGS. 6A, 6B, and 6C show sectional views of an arch type tunnel, the inner surface thereof being applied with a concrete coating by using the apparatus shown in FIG. 3;

FIG. 7 is a longitudinal sectional view showing a modified rotary disc and agitator utilized in the present invention;

FIG. 8 is a side view showing the base plate of the agitator utilized in the apparatus shown in FIG. 7;

FIG. 9 is a side view, partly in longitudinal section showing still another modification of the present invention;

FIGS. 10 and 11 are diagrammatic representations showing the apparatus shown in FIG. 9 and various devices for preparing ingredients of concrete;

FIG. 12 is a diagrammatic representation showing the apparatus of the present invention representing the wet method of application;

FIG. 13 is a longitudinal sectional view showing a modified projector capable of obliquely projecting green concrete;

FIG. 14 is a sectional view of a modified projector;

DESCRIPTION OF THE PREFERRED EMBODIMENTS

Figure 1:
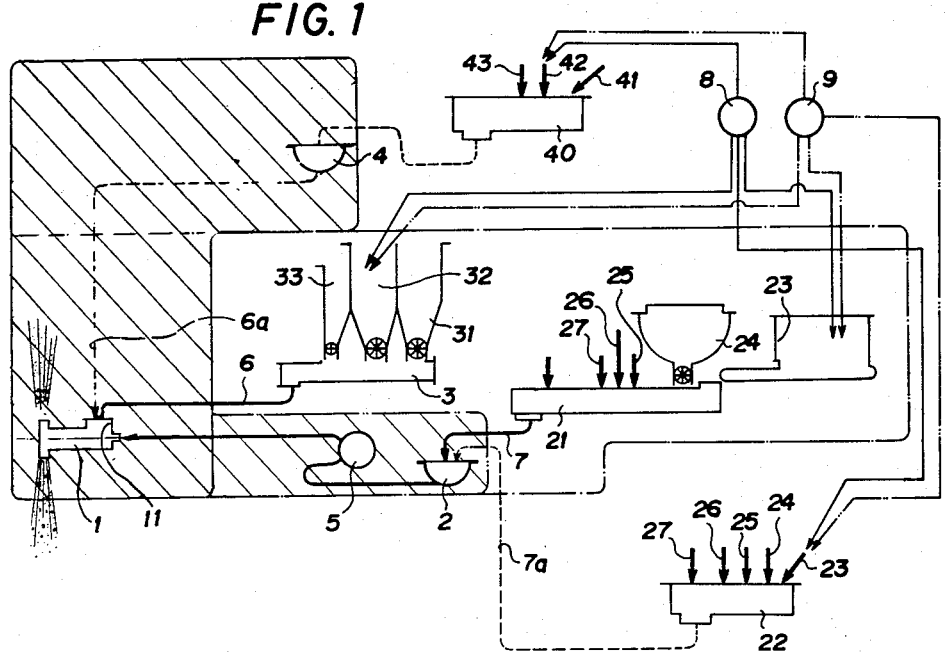
FIG. 1 is a diagrammatic representation showing the apparatus of the present invention utilized to project concrete, and various devices for preparing ingredients of concrete.

The projection apparatus 1 of this invention is utilized in a system as shown in FIG. 1. The projection apparatus 1 is connected to apparatus 2 for preparing a flowable substance, mortar or paste for example, via pump 5 and conduits. Either one or both of mixers 21 and 22 are connected with the apparatus 2 through conveyors 7 and 7a or the like. A cement hopper 24, a sand hopper 23, an additive hopper 25 and a water addition pipe 26 are provided for the mixer 21, while similar hoppers 23–25, a primary water addition pipe 26 and a secondary water addition pipe 27 are provided for the mixer 22. Dry material preparing devices 3 and 4 are provided for the projecting apparatus 1 and dry materials prepared by the devices 2 and 3 are conveyed by conveyors such as belt conveyors 6 and 6a into a hopper 11 provided for the projection apparatus 1.

A coarse aggregate hopper 31, a fine aggregate hopper 32 and a quick setting agent hopper 33 are mounted above the dry material preparing device 3, whereas the dry material preparing device 4 is provided with a mixer 40 and above which are mounted a coarse aggregate hopper 41, a fine aggregate hopper 42 and a quick setting agent hopper 43. Each of the hoppers 23–27, 31–33 and 41–43 is provided with a constant feeder so that predetermined amounts of the additives are supplied to the preparation devices. Predetermined quantities of the primary and secondary waters are also incorporated.

Figure 2:
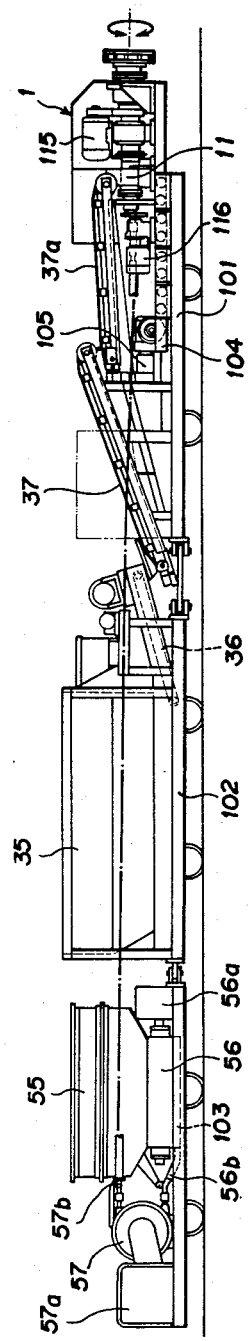
FIG. 2 is a side view of a projecting apparatus mounted on a carriage and used for projecting concrete.

The concrete projecting apparatus may be constructed as a carriage type as shown in FIG. 2 or a robot type as shown in FIG. 3. The central pipe 13 (FIG. 3) for conveying flowable materials is connected to a pipe from the pump 5 extends in the horizontal direction along the axis of the projecting apparatus 1. The outer end of the central pipe 13 is opened toward the center of a rotary disc 18 having a plurality of blades 16. A dry material supply cylinder 12 concentrically surrounds the central pipe 13, and a screw conveyor 19 extends therebetween from the hopper 11 to the rotary disc 18. With the embodiment shown in FIG. 3, the screw conveyor 19 is secured to the periphery of the central pipe 13 which is rotated by an electric motor, and the supply cylinder 12 is made rotatable by a gear 12a, but may be held stationary. Alternatively, the screw conveyor 19 may be secured to the inner surface of the supply cylinder which is rotated by an electric motor. In any case, by the rotation of the screw conveyor 19, the material supplied from hopper 11 is conveyed to the rotary disc 18 through the supply cylinder 12. The quantity of the material supplied to the rotary disc 18 is proportional to the number of revolutions of the screw conveyor 19.

The rotary disc 18 is secured to one end of a rotary cylinder 14 surrounding the supply cylinder 12. The rotary cylinder 14 is rotated by a pulley 14a secured to the other end thereof for radially projecting the material on the rotary disc 18. The rotary disc 18 and the screw conveyor 19 may be rotated at different speeds. The speed of the conveyor determines the quantity of the dry material supplied to the rotary disc 18, while that of the rotary disc 18 determines the projection energy. Of course, the quantity of the flowably material through the central pipe 13 can be varied properly. By a suitable combination of these parameters, any desired concrete projection can be made.

Figure 5:
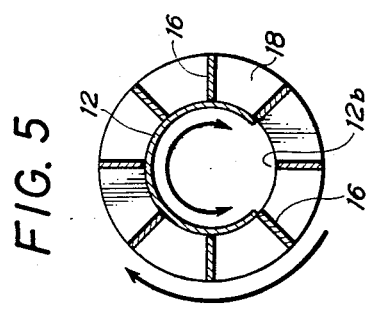
FIG. 5 is a sectional view of a projection direction control device utilized in the apparatus shown in FIG. 3.

An agitator 85 is preferably secured to the rotary disc 18 at a position confronting the discharge end of the central pipe 13, as shown in FIGS. 3 and 4. More particularly, the agitator 85 is mounted on the inner side of a base plate 86 fitted to the central portion of the rotary disc 18 and provided with a plurality of agitating blades 87 and 88 as shown in FIG. 3. The base plate 86 is secured to the rotary disc 18 by a bar 89 held by ankers 18a on the periphery of the rotary disc 18. By depressing a spring member 89a, the bar 89 may be disengaged from the ankers 18a so that it is possible to dismount the base plate 86 by grasping handles 86a for cleaning or adjusting the agitator blades 87 and 88. The embodiment shown in FIG. 3 is advantageous in that the direction of projecting is adjustable with a simplified construction. More particularly, the supply cylinder 12 surrounds the agitation blades 87 and 88 and extends close to the rotary disc 18. As shown in FIG. 5, a portion of the cylinder 12 is removed at 12b so that as the angular position of the supply cylinder 12 is adjusted the direction of projection can be varied, thus enabling projection of green concrete in any desired direction as shown in FIG. 6.

In the embodiment shown in FIG. 3, the projector 1 is mounted on an operating base 50 through a swinging mechanism 51, and the operating base 50 is supported by a supporting arm 52 and an operating cylinder 53, so that the projector 1 can be moved in the vertical direction by the cylinder 53 and swung by the swinging mechanism 51 for projecting green concrete at a desired position and in a desired direction.

Where a carriage type is adopted, materials prepared by the preparation devices 2 and 3 can also be conveyed to the working field by the carriage. Such construction is shown in FIG. 2. More particularly, a first carriage 101 carries a rotary projector 1, a second carriage 102 carries a hopper 35 for storing materials prepared by the dry material preparation device 3. The dry material in the hopper 35 is taken out from the bottom thereof by a take out mechanism 36 and then conveyed to the projector 1 by conveyors 37 and 37a. A third carriage 103 carries a hopper 55 for storing flowable material prepared by the flowable material preparation device 2 (FIG. 1). An agitator 56 driven by an electric motor 56a is disposed in the bottom of the hopper 55, and a duct 56b extending from the agitator 56 is connected to a mortar pump 57 driven by an electric motor 57a, and the central pipe 13 of the projector 1 is connected to a discharge port 57b opening at the upper portion of the mortar pump 57.

The projector 1 is mounted on the first carriage 101 via slide blocks 104 which are moved on the first carriage 101 by electric motors 105 to move forwardly or rearwardly the projector 1 while all carriages 101-103 are stopped depending upon the conditions of the working field for projecting green concrete upon the surface of a tunnel just dug. An electric motor 115 is mounted on the first carriage 101 for rotating the rotary disc 18 of the projector 1, and another motor 116 is mounted for rotating the screw conveyor 19.

When the apparatus shown in FIG. 2 is used for a wet type concrete working, the carriage 103 is substituted by a green concrete wagon, and the carriage 102 is reciprocated between an inlet and the working field in a tunnel so as to load the green concrete kneaded in the green concrete wagon into the hopper carried by the carriage 102 at the inlet of the tunnel. The carriage 102 is moved to the carriage 101 at the working field and the green concrete is transferred to the carriage 101. In this case, since the green concrete is forced to pass through the central pipe 13 by a pump, it is advantageous to increase the fluidity of the green concrete. It is advantageous to convey a green mortar consisting of cement, a fine aggregate and water through the central pipe 13, while supplying a dry coarse aggregate and a quick setting agent from hopper 11. Then, it becomes possible to successively convey green concrete carefully prepared to the tunnel inlet by a green concrete wagon for carrying out the wet method without installing a concrete mixer in the tunnel.

With the agitator shown in FIGS. 3 and 4 the agitation is effected mainly by the blades 87 whereas the blade 88 is slightly inclined with respect to the axis of the rotary screw 19 for conveying the green concrete to the rotary disc 18.

FIGS. 7 and 8 show a modified agitator. In this modification a feeder 85a comprising long and short blades 87a and 87b is provided on the inside of the base plate 86 fitted in the central portion of the rotary disc 18, and an agitation blade 88 is provided at the fore end of the screw conveyor 19. Each of the blades 87a and 87b is shaped such that its cross-section gradually decreases in the direction of conveyance of the material. Thus, the dry material is conveyed by the screw conveyor 19, agitated by blade 88 and then fed onto the rotary disc 18 by the feeder 85a. The base plate 86 is fastened to the rotary disc 18 by a fastening member 89b and bolts 89c on the opposite ends thereof. However, the base plate 86 may be removably secured to the rotary disc as shown in FIG. 4. Where the green concrete is applied onto the irregular surface of a tunnel it is advantageous to use a reversible motor for rotating the rotary cylinder 14 so as to reverse the direction of rotation of the rotary disc 18. Then, portions which are difficult to cover with concrete when the rotary disc 18 is rotated in one direction can be covered.

As above described according to the apparatus of the present invention, it is possible to suitably combine machines installed on the outside and inside of a tunnel depending upon the diameter of the tunnel and the condition of the working field. At a minimum, projector 1 and preparation device 4 are installed at the working field and the other machines are installed on the outside of the tunnel. In a certain case, pump 5 and flowable material preparation device 2 can be installed in the tunnel and in a larger tunnel, other machines shown by dot and dash lines can also be installed in the tunnel.

The apparatus of this invention can be advantageously applied for conventional projection method. For example, in the wet method, green mortar or green concrete is conveyed through the central pipe 13 by using a pump as has been described in connection with FIG. 6, and gravel is supplied to the supply cylinder 12 together with such quick setting agent as caustic silicate, calcium chloride, sodium aluminate, and sodium carbonate for adding then to the flowable substance on the rotary disc 18 and then projecting the mixture. In the conventional wet method, the diameter of the conduit is decreased at the nozzle and high pressure air is utilized for blasting so that it is necessary to use a pump operating at a high pressure. Even with such measure, it has been difficult to convey the materials over a long distance as has been pointed out hereinbefore. According to the apparatus of this invention it is not necessary to use high pressure air and to reduce the diameter of the conduit near the nozzle, so that it is possible to convey materials over a long distance with a small pump. Moreover, as the green concrete is projected by the centrifugal force of the rotary disc, even when the material, are conveyed to the rotary disc at a relatively low speed, sufficiently large projecting energy can be applied to the materials. When the invention is applied to the dry method, water is added to a dry mixture conveyed by the screw conveyor in the supply cylinder through the central pipe. When an agitator shown in FIGS. 3 and 4 or 7 and 8 is used the mixture is thoroughly admixed to increase the mechanical strength of the projected concrete. Moreover, reflection of the projected concrete is decreased, thus obviating defects of the dry method while enjoying advantageous merits thereof.

The utility of the apparatus of this invention shown in FIG. 1 can be enhanced by providing the device 8 for hoppers 23 and 32 supplying sand or fine aggregate in order to make uniform the surface water on the fine aggregate. Sand is collected in the river side or sea side and then transported to a concrete mixer. The quantity and state of water on the particles of sand vary variously. For example, even with the sand produced from the same source, when the sand is piled up in a yard, the quantity of water differs greatly at the top, bottom and center of the pile. Even in the sand sampled at the top, the content of water is greatly influenced by weather. More particularly, some of the sand particles are dry while the others are wet. As is well known in the art, when preparing a green concrete the amounts of water and air contained therein have a great influence upon the strength of the resulting concrete as well as upon the viscosity and workability of the green concrete. According to this invention, the quantity and state of water on the sand particles are preferably made uniform for determining a rational proportion of the ingredients. When the amount of water on the sand particles is made uniform, the water to cement ratio W/C essential to the preparation of green concrete can be accurately determined. Regarding sand to cement ratio S/C and sand to gravel ratio S/A, where the amount of water on the sand particles is made uniform these ratios can also be made accurate. Advantageously, cement power is firstly incorporated to sand with adjusted surface water to form shells about sand particles. Such shells contain cement at a high proportion so that they are stable and would not be broken during conveyance with a pump and when projected by the rotary disc. Moreover the shells make irregular sand particles to be spherical which makes it easy to convey with a conveyor. To make uniform the quantity of water on the sand particles various methods may be used.

According to this invention, since the green concrete is projected against a surface by centrifugal force without using any high pressure air there is no sputtering of the projected concrete caused by the high pressure air and the applied concrete is compressed by the velocity energy of subsequently projected green concrete. Although the flowable slurry material conveyed by a pump has a sufficiently high fluidity, as it is thoroughly admixed with dry materials on the rotary disc, the concrete product after projection has a sufficiently high shear strength. More particularly, during the admixture, due to the dry materials the ratio W/C is decreased, while the ratio S/C or A/C is increased so that the shear strength of the product can be improved. In other words, a concrete layer having a sufficient thickness can be formed by a single projection.

Furthermore, according to this invention, the quick setting agent can be used more efficiently. For example, when the apparatus of this invention is used for the wet method, the quick setting agent is added in a dry state. In this case, it is possible to uniformly admix the quick setting agent with green concrete or green mortar conveyed through the central pipe 13 during the conveyance thereof thus improving the action of the quick setting agent. In a dry method, the quick setting agent is supplied together with such dry ingredients as cement powder and aggregate, the quick setting agent will be uniformly admixed with dry ingredients until they arrive at the rotary disc 18. According to the prior art blasting method, immediately prior to the blasting (that is at the nozzle) as the quick setting agent is added to the viscous material with its W/C and S/C ratios suitably adjusted, particles of the quick setting agent would adhere to the surface of lump or particle shaped viscous material, thus failing to uniformly dispersing the quick setting agent. Where high pressure air is used for blasting, fine particles of the quick setting agent would float in surrounding atmosphere thus forming stimulative atmosphere. According to this invention as above described, since the quick setting agent can be uniformly distributed and since no high pressure air is used, the defects described above can be obviated.

When an aggregate formed with cement shells is supplied through the supply cylinder 12 in a dry state, a relatively low speed quick setting agent is used to prevent setting in the supply tube.

As above described, according to this invention, since the quick setting agent is uniformly distributed and no high pressure air is used, the quantity of the quick setting agent can be reduced which is not only economical but also improves the strength of the resulting concrete structure over a long time.

In a modification shown in FIG. 9, a plurality of material supply pipes are provided through the central pipe 13. More particularly a main ingredient supply pipe 13a and an auxiliary supply pipe 13b are inserted through the central pipe 13 and these supply pipes are connected with conduits 130a and 130b respectively.

Materials are supplied to the supply pipes 130a and 130b and to the hopper 11 in a manner as shown in FIG. 10. More particularly, materials taken out from the tank 64 are sent to the hopper 11 of the projector 1 via a conveyor 64a, while main and auxiliary materials are supplied to the supply pipes 13a and 13b in the central pipe 13 from tanks 65 and 66 via flow meters 67 and pump 68. For example, where a resin concrete is to be projected, a main material of the resin concrete and a quick setting agent are contained in the main and auxiliary tanks 65 and 67 respectively, and such aggregate as silicate sand or stone is discharged from the tank 64.

When the apparatus shown in FIG. 10 is used for coating the inner surface of a tunnel, tanks 64, 65 and 66, and projector 1 may be installed in a tunnel A, and a mixture is supplied to the tank A from a mixer 70 installed on the outside of the tunnel A as shown in FIG. 11. Conventional feeders 71-74 are provided for the mixer 70 to supply such materials as cement, a powder of a quick setting agent, a fine aggregate such as sand, and a coarse aggregate such as gravel or crushed stone. Water is supplied to the main tank 65, while a liquid quick setting agent is supplied to the auxiliary tank 66. Then the apparatus of this invention can be satisfactorily used for the dry process.

In the foregoing description, although a flowable material such as a cement paste or mortar or liquid was fed through the central pipe 13 and a dry aggregate and/or additives were fed through the supply cylinder 12, it will be clear that the invention is not limited to such an arrangement. Briefly stated, according to the present invention, in consideration of the first and second materials necessary to prepare green concrete or mortar to be projected, the first material is conveyed through the central pipe 13 by low pressure air or a pump and the second material is loaded into the supply cylinder 12 through hopper 11 and then mechanically conveyed by the screw conveyor 19. Finally, these materials are admixed and projected by a rotary projector. Since the central pipe 13 has a smaller diameter than the supply cylinder 12 and since the first material is conveyed through the central pipe under pressure, the first material should have a fluidity of a certain degree. On the other hand, the second material is not required to be flowable because it is conveyed to the hopper by a conveyor belt or a large diameter pipe and then mechanically conveyed by a screw conveyor 19.

Considering these factors, an arrangement shown in FIG. 12 is suitable for use in the apparatus of the present invention for the wet method. The projector 1 and the preparation device 120 for a quick setting agent are installed in a tunnel, and a green concrete conveyed by a concrete mixer car 117 is supplied to the hopper 11 by a pump 118 and a conduit 119 and then mechanically conveyed by a screw conveyor 19. Where a liquid quick setting agent is used, it is supplied through the central pipe 13 under its hydrostatic pressure, whereas when a powdery quick setting agent is used it is conveyed by air pressure. The preparation and conveyance of the materials are the same as the prior art wet method, and the fluidity of the green concrete prepared to have a desired ratio W/C is also small. However, according to this invention, only the conveyance of the green concrete to the hopper 11 is important and no blasting energy is required. Accordingly, it is possible to greatly reduce the pressure necessary for conveyance and to increase the length of conveyance.

In the projector shown in FIGS. 1-12, the green concrete is projected in a direction perpendicular to the direction of conveyance. FIGS. 13 and 14 show modified projectors capable of obliquely projecting the green concrete. In working a tunnel, a frame work is generally fabricated with H shaped steel bars or the like so that with a projector that projects only in the vertical direction, it is difficult to project concrete into the frame work. Consequently the projected concrete does not efficiently bond to the frame work. But where a projector, as shown in FIG. 13 or 14, is used the green concrete can be efficiently projected into the frame work. In the modified projector an annular auxiliary projection plate 180 having an inclined guide surface 181 is secured to the discharge end of the rotary disc 18, the auxiliary projection plate 180 being also provided with blades 186. In a case shown in FIG. 13, the guide plate 181 is directed forwardly, whereas in a case shown in FIG. 14, the guide plate 181 is directed rearwardly. It is advantageous to prepare both types of the guide plate and select one of them which is secured to the rotary disc with set screws 183 and 184. The auxiliary projecting plate 180 may be divided into a plurality of sections for faciliating assembly.

When these modified projectors are used, the direction of the projected green concrete is determined by the guide surface 181 of the auxiliary projection plate 180 as shown in FIG. 13 so that when a framework is fabricated with H type steel stocks 150 on the inner surface of a tunnel, the concrete is efficiently projected into the framework 150 thus preventing formation of voids in the projected concrete. When the green concrete is to be projected against the opposite side of the framework the direction of movement of the apparatus is reversed or reciprocated, or the auxiliary projecting plate 180 shown in FIG. 14 is used, The agitator 85 shown in FIG. 13 is constituted by blades 87 and 88, slightly different from those shown in FIGS. 7 and 11, but operating similarly.

Figure 16:
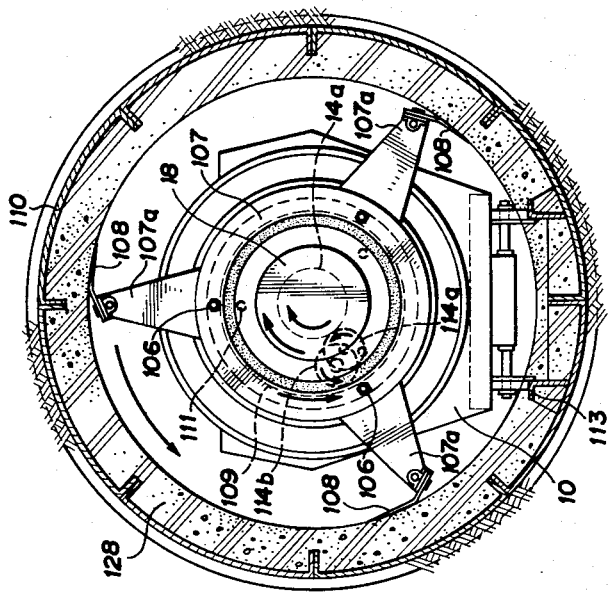
FIG. 16 is an end view thereof.
Figure 15:
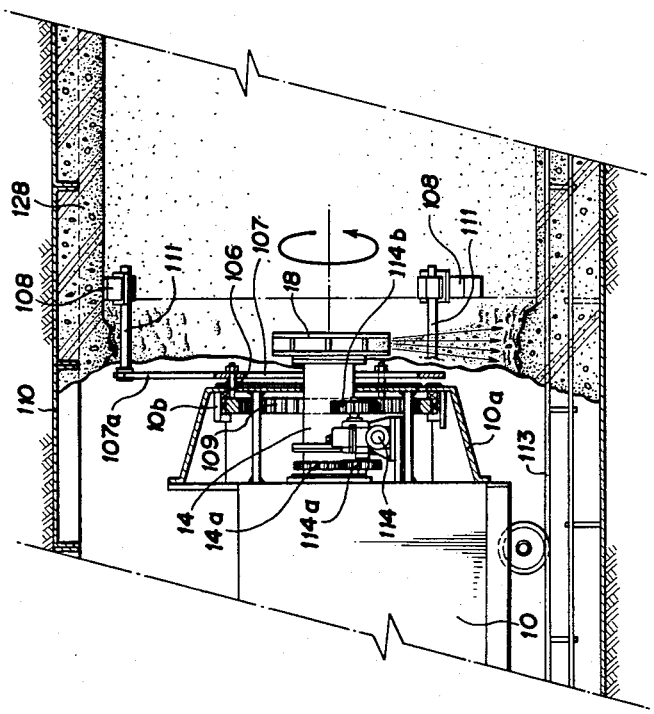
FIG. 15 is a longitudinal sectional view showing still another modification of the present invention.

FIGS. 15 and 16 show still another embodiment of the present invention especially suitable for use in a circular tunnel to obtain a smooth finished surface. The circular tunnel has a high pressure resistant property characteristic and when water is passed therethrough it can resist the water pressure. When a concrete coating is applied by a prior art blasting method the surface of the blasted concrete layer becomes irregular so that it becomes necessary to blast concrete motor once again to obtain a smooth finish surface.

The modification shown in FIGS. 15 and 16 is constructed to eliminate these disadvantages. At first a shell 100 made of a steel plate is applied to the inner surface of a tunnel, and a carriage 10 supporting a blasting apparatus of this invention is run along rails 113. A green concrete is supplied to the rotary disc 18 to project the concrete by centrifugal force. Ironing plates 108 are rotated concentrically with the rotary disc 18 to finish the surface of the projected concrete layer 128. More particularly, the rotary disc 18 is mounted on the front end of the rotary cylinder 14 and is rotated by an electric motor 114 through gears 114a and 14a. A cover 10a is provided for the front end of the carriage 10, and a large diameter ring gear 109 is rotatably supported by a support 10b in the cover 10a. A circular disc 107 is secured to the gear 109 through connecting rods 106. A plurality of ironing member supporting members 107a are mounted on the periphery of the disc 107 at an equal spacing, and the ironing members 108 are secured to the supporting members 107a by rods 111. A gear 114b driven by the motor 114 engages the inner gear of the ring gear 109 to drive the same. Rails 113 on which the carriage 10 runs are embedded in a concrete layer 128 formed by projection so that these rails act to reinforce the concrete layer.

In addition to various advantages described in connection with FIGS. 1 through 14, with the embodiment shown in FIGS. 15 and 16 the ironing members 108 apply pressure to the coated concrete layer to smoothly finish its surface and to make uniform its thickness.

To have better understanding of this invention, the following examples are given by way of illustration only and in which all % are weight percent.

The examples are not intended in any way to limit the scope of the present invention.

EXAMPLE 1

Batch mixer 22 and dry material preparation device 4 shown in FIG. 1 were installed in a tunnel. Mountain sand S was used as the fine aggregate, No. 7 crushed stone as the coarse aggregate and a compound consisting essentially of an aluminate (trade name Natomic No. 5) as the quick setting agents.

These ingredients were mixed together. In the flowable material preparation device 2, the mountain sand S, an ordinary Portland cement C acting as a hydraulic powder and water W were mixed together at weight ratios as shown in the following Table I.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

TABLE I

| | Fundamental composition/m³ | | | | | | | |
|---|---|---|---|---|---|---|---|---|
| | Flowable material conveyed by pump | | | | | Dry material | | |
| Sample No. | W/C (%) | S/C | C (Kg) | S (Kg) | W (Kg) | dehydration agent [f] | S (Kg) | G (Kg) | Quick setting agent (%) |
| 1 | 47 | 1.75 | 350 | 612.5 | 161.7 | 2.8 | 790.2 | 357.4 | 1.0 |
| 2 | 50 | 2.0 | 350 | 700 | 172.2 | 2.8 | 682 | 345 | 0 |
| 3 | 50 | 2.0 | 350 | 700 | 172.2 | 2.8 | 682 | 345 | 5.0 |

TABLE I-continued

| | | | Fundamental composition/m³ | | | | | |
|---|---|---|---|---|---|---|---|---|
| | | Flowable material conveyed by pump | | | | Dry material | | |
| Sample No. | W/C (%) | S/C | C (Kg) | S (Kg) | W (Kg) | dehydration agent (l) | S (Kg) | G (Kg) | Quick setting agent (%) |
| 4 | 50 | 2.0 | 350 | 700 | 172.2 | 2.8 | 682 | 345 | 7.1 |

The rotary projector shown in FIG. 3 was used. The rotary disc 18 thereof had a diameter of 50 cm and rotated at a speed of 500 r.p.m. The quantity of the mortar conveyed by the mortar pump 5 was 59 l/min in each Example. Quantities of the dry materials conveyed by the conveyor was 140.6 Kg/min in Example 1, and 109.2 Kg/min in Examples 2, 3 and 4. The compositions of the green concrete projected upon the inner surface of a tunnel, percentage of rebound and the strengths of the resulting concrete are shown in the following Table II.

TABLE II

| | Composition of projected cement/m³ | | | | | | | | Compression strength (Kg/cm²) | | |
|---|---|---|---|---|---|---|---|---|---|---|---|
| Sample No. | W/C (%) | S/C S/C | S/A (%) | C (Kg) | S (Kg) | G (Kg) | W (Kg) | quick setting agent (Kg) | Rebound (%) | one day after | 7 days after | 28 days after |
| 1 | 45.3 | 4.1 | 79.3 | 360 | 1495 | 390 | 163 | 3.6 | 19.6 | — | 219.6 | 251.9 |
| 2 | 49.2 | 4.0 | 79.7 | 356 | 1438 | 367 | 175 | 0 | 9.8 | 65.6 | 175.4 | 242.5 |
| 3 | " | " | " | " | " | " | " | 17.8 | 18.9 | 96.6 | 214.4 | 265.7 |
| 4 | " | " | " | " | " | " | " | 24.8 | 16.9 | 61.4 | 175.9 | 221.9 |

As can be noted from this table, the percentage of the dust was small in each Example so that the work could be continued after working over several tens minutes to two or more hours.

EXAMPLE 2

The same conditions as in Example 1 were used but the composition and additives were changed as shown in the following Table III.

TABLE III

| | Fundamental composition/m³ | | | | | | | | | | |
|---|---|---|---|---|---|---|---|---|---|---|---|
| | Flowable material conveyed by pump | | | | | | | Dry material | | | |
| Sample No. | C (Kg) | S (Kg) | W (Kg) | W/C (%) | S/C (%) | dehydration agent (l) | additive | S (Kg) | G (Kg) | quick setting agent (%) | C (Kg) |
| 1 | 350 | 1050 | 207.2 | 60 | 3.0 | 2.8 | — | 332.6 | 347 | 5 | — |
| 2 | " | 850 | 200.2 | 57 | 2.5 | " | — | 509.2 | 347.4 | " | — |
| 3 | " | 612.5 | 161.7 | 47 | 1.75 | " | — | 790.2 | 357.4 | 4.8 | — |
| 4 | " | 700 | 172.2 | 50 | 2.0 | " | — | 682 | 345 | 5.1 | — |
| 5 | " | 850 | 200.2 | 57 | 2.5 | " | — | 509.2 | 347.4 | 8.8 | — |
| 6 | " | " | " | " | " | " | — | " | " | 5.7 | — |
| 7 | " | " | " | " | " | " | — | " | " | 8.1 | — |
| 8 | " | 700 | 172.2 | 50 | 2.0 | " | viscosity intensifier 0.05% | 682 | 345 | 5.0 | — |
| 9 | " | " | " | " | " | " | viscosity intensifier 0.1% | " | " | 4.5 | — |
| 10 | " | " | " | " | " | " | steel fiber 0.5% | " | " | 7.1 | — |
| 11 | " | — | 115.5 | 33 | — | " | — | 1381 | 603.2 | 6.7 | — |
| 12 | " | — | 115.5 | " | — | " | — | 1285 | 566 | 2.8 | 150 |
| 13 | " | 700 | 234.7 | 67.1 | 2.0 | " | — | 682 | 345 | 2.4 | — |

The quantity of the materials supplied to the rotary disc 18 through central pipe 13, and supply pipe 14, the number of revolutions of the rotary disc 18 and the composition of the green concrete prepared were varied variously as shown in the following Table IV.

TABLE IV

| | Composition of projected cement (Kg/m³) | | | | | | | | | | |
|---|---|---|---|---|---|---|---|---|---|---|---|
| | Discharged quantity | | | | | | quick hardening agent (%) | | | | Number of revolutions of rotary disc 18 (rpm) |
| | Central pipe (l/min) | supply pipe (Kg/min) | C (Kg) | S (Kg) | G (Kg) | W (Kg) | | W/C (%) | S/C | S/A (%) | |
| 1 | 61.6 | 70 | 340 | 1396 | 407 | 201 | 17 | 59.1 | 4.1 | 77.4 | 500 |
| 2 | 41.9 | 87 | 308 | 1433 | 476 | 172 | 15.4 | 55.6 | 4.7 | 75.1 | " |
| 3 | 59 | 140.6 | 360 | 1495 | 390 | 163 | 17.3 | 45.3 | 4.1 | 79.3 | " |
| 4 | " | 109.2 | 356 | 1438 | 367 | 175 | 10 | 49.2 | 4.0 | 79.7 | " |
| 5 | 59 | 87 | 353 | 1415 | 387 | 197 | 31.1 | 55.8 | " | 78.5 | " |

TABLE IV-continued

| | Discharged quantity | | Composition of projected cement (Kg/m³) | | | | | | | | Number of revolutions |
|---|---|---|---|---|---|---|---|---|---|---|---|
| | Central pipe (l/min) | supply pipe (Kg/min) | C (Kg) | S (Kg) | G (Kg) | W (Kg) | quick hardening agent (%) | W/C (%) | S/C | S/A (%) | of rotary disc 18 (rpm) |
| 6 | " | " | " | " | " | " | 20.1 | " | " | " | 600 |
| 7 | " | " | " | " | " | " | 28.6 | | | | 700 |
| 8 | " | 109.2 | 356 | 1438 | 367 | 175 | — | 49.2 | " | 79.7 | 500 |
| 9 | " | " | " | " | " | " | — | " | " | " | " |
| 10 | " | " | " | " | " | " | — | " | " | " | " |
| 11 | 21.6 | 133 | 438 | 1184 | 515 | 200 | 21 | 45.7 | 2.7 | 70.3 | " |
| 12 | " | 127 | 569.8 | 1093 | 481 | 202 | 9.8 | 35.5 | 1.92 | 70 | " |
| 13 | 59 | 109.2 | 338 | 1384 | 358 | 226 | 81 | 66.9 | 4.1 | 79.4 | " |

Remark:
In example 13, projector shown in FIGS. 11 and 12 was used and its direction of rotation was reversed.

The compression strength of the resulting concretes, the quantity of the dust and percentage of rebound generated at the time of projecting green concretes of respective Examples are shown in the following Table V.

TABLE V

| Sample No. | Compression strength (Kg/m²) | | Rebound (%) | Dust (mg/m²) |
|---|---|---|---|---|
| | 7 days after | 28 days after | | |
| 1 | 169 | 245 | 17.6 | 2.1 |
| 2 | 183 | 263 | 19 | 1.8 |
| 3 | 175 | 279 | 12.5 | 2.0 |
| 4 | 180 | 251 | 14.8 | 2.5 |
| 5 | 173 | 232 | 12.4 | 1.5 |
| 6 | 215 | 284 | 13.3 | 1.2 |
| 7 | 201 | 253 | 10.2 | 2.3 |
| 8 | 174 | 226 | 12.4 | 1.9 |
| 9 | 193 | 289 | 19.9 | 3.0 |
| 10 | 221 | 272 | 11.9 | 3.1 |
| 11 | 284 | 352 | 12.6 | 2.3 |
| 12 | 389 | 476 | 14.8 | 2.5 |
| 13 | 165 | 253 | 9.1 | 2.3 |

As can be noted from this table the quantity of dust generated is small in each Example.

What is claimed is:

1. Apparatus for projecting mortar or concrete comprising:
   a first material supply pipe for conveying under pressure said first material, one of ingredients of said mortar or concrete;
   a hopper charged with second material, the other ingredient of said mortar or concrete;
   a second material supply pipe connected to said hopper;
   a rotary screw disposed in said second material supply pipe for mechanically conveying said second material supplied from said hopper; and
   a rotary disc for admixing said first and second materials conveyed through said first and second material supply pipes to project a resulting mixture;
   said first and second material supply pipes and said rotary disc being arranged coaxially and said first and second material supply pipes being arranged concentrically.

2. The apparatus according to claim 1 wherein said rotary disc is provided with means for controlling the direction of projection of said mixture.

3. The apparatus according to claim 1 wherein a discharge end of said second material supply pipe extends close to said rotary disc and said discharge end is provided with a notch for controlling a direction of projection of said mixture.

4. The apparatus according to claim 3 which further comprises means for rotating said second material supply pipe.

5. The apparatus according to claim 1 wherein said rotary disc is provided with means for agitating said mixture at about the center thereof.

6. The apparatus according to claim 5 wherein said rotary disc comprises an annular outer ring and a central disc removably mounted in said annular outer ring and said agitating means is supported by said central disc.

7. The apparatus according to claim 1, wherein said rotary screw is secured to a periphery of said first material supply pipe and means is provided for rotating said first material supply pipe.

8. The apparatus according to claim 1 wherein said rotary screw is secured to an inner surface of said second material supply pipe and means is provided for rotating said second material supply pipe.

9. The apparatus according to claim 1 wherein said first material supply pipe comprises a main ingredient supply pipe and an auxiliary ingredient supply pipe.

10. The apparatus according to claim 1 wherein said rotary disc is provided with annular projecting means having a projecting surface inclined to said disc.

11. The apparatus according to claim 1 wherein said rotary disc is provided with a plurality of ironing members arranged on a circle having a diameter larger than said disc for ironing a surface of projected layer.

* * * * *